United States Patent [19]
Forrester

[11] Patent Number: 4,851,749
[45] Date of Patent: Jul. 25, 1989

[54] AUTOMATIC POSITIONER WITH NONLINEAR DRIVE

[75] Inventor: Lester L. Forrester, Ridgecrest, Calif.

[73] Assignee: General Dynamics Corp., Pomona Div., Pomona, Calif.

[21] Appl. No.: 131,472

[22] Filed: Dec. 10, 1987

[51] Int. Cl.$^4$ .............................................. G05B 19/42
[52] U.S. Cl. ................................. 318/568.11; 318/630
[58] Field of Search .............................. 318/568, 630

[56] References Cited

U.S. PATENT DOCUMENTS

| | | | |
|---|---|---|---|
| 3,261,967 | 7/1966 | Rosin et al. | 360/560 |
| 3,324,369 | 6/1967 | Markakis | 318/138 |
| 3,345,547 | 10/1967 | Dunne | 318/696 |
| 3,353,076 | 11/1967 | Haines | 318/696 |
| 3,426,258 | 2/1969 | Van Pelt | 318/640 |
| 3,573,593 | 4/1971 | Beery | 318/696 |
| 3,660,746 | 5/1972 | Milek | 318/696 |
| 3,683,254 | 8/1972 | Masse et al. | 318/608 |
| 3,719,878 | 3/1973 | Ferguson et al. | 318/565 |
| 3,748,566 | 7/1973 | Brembs | 318/685 |
| 3,811,648 | 5/1974 | Ream, Jr. et al. | 250/578 |
| 3,893,012 | 7/1975 | Lin | 318/696 |
| 3,942,619 | 3/1976 | Nordstrom et al. | 400/119 |
| 3,961,232 | 6/1976 | Newell | 318/46 |
| 4,039,919 | 8/1977 | Suzaki et al. | 318/696 |
| 4,042,863 | 8/1977 | von der Heide | 318/254 |
| 4,042,868 | 8/1977 | Rhodes | 318/615 |
| 4,042,869 | 8/1977 | Eickelberg et al. | 318/630 |
| 4,107,595 | 8/1978 | Campe | 318/696 |
| 4,110,828 | 8/1978 | Baumgartner et al. | 364/562 |
| 4,158,800 | 6/1979 | Jahelka et al. | 318/685 |
| 4,234,787 | 11/1980 | Hutter et al. | 377/17 |
| 4,289,983 | 9/1981 | Bengnar et al. | 310/49 R |
| 4,507,595 | 3/1985 | Rozsa | 318/630 |

OTHER PUBLICATIONS

"Sequence Control for Stepper Motors", IBM Technical Disclosure Bulletin, vol. 19, No. 4, Sep. 1976, 1199-1200, A. E. Fleek, J. Mako and J. P. Pawletko.

Primary Examiner—William M. Shoop, Jr.
Assistant Examiner—Saul M. Bergmann
Attorney, Agent, or Firm—Henry Bissell; Leo R. Carroll

[57] ABSTRACT

A motor driven mechanical positioner is provided which will position a movable arm to any one of 840 discrete angular positions. A total angular range of +/−42° can be covered in 0.1° increments. Electronic circuitry controls the nonlinear drive mechanism. A drive shaft wheel has six evenly spaced holes through which light from an IR LED is allowed to shine on a phototransistor placed on the other side of the wheel. As a result of the intermittent light striking the phototransistor, six clock pulses are generated for every revolution of the drive shaft. A desired angular position is entered into the electronics via thumb wheel BCD switches. The BCD information from the switches is transformed into binary information to address EPROMs. For each possible binary address representative of a desired angular position, the selected EPROMs output binary data that is representative of the clock pulse count for that particular angular position. In order to compensate for the nonlinearity of the drive mechanism, the clock pulse count is incremented at a nonlinear rate as the angular position is increased. Additional circuitry in the automatic positioner senses when the mechanism is within a preset distance from where it should be, and when this occurs a presettable slow drive speed is implemented to minimize overshoot.

8 Claims, 7 Drawing Sheets

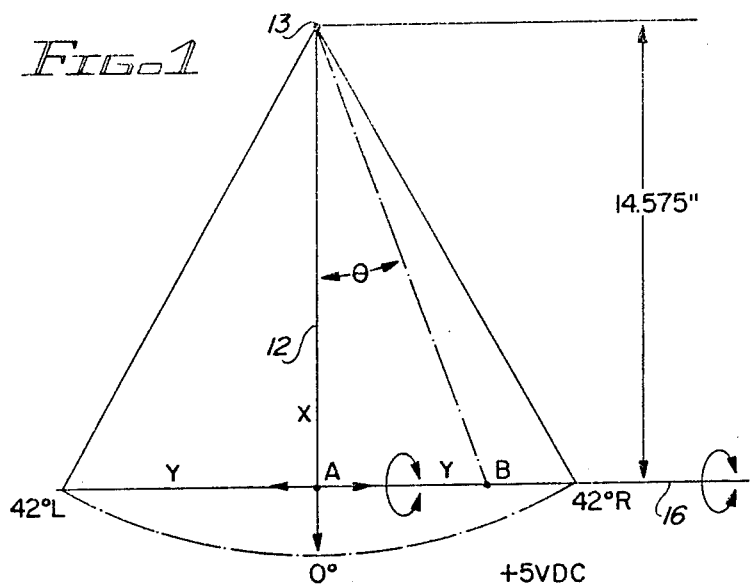
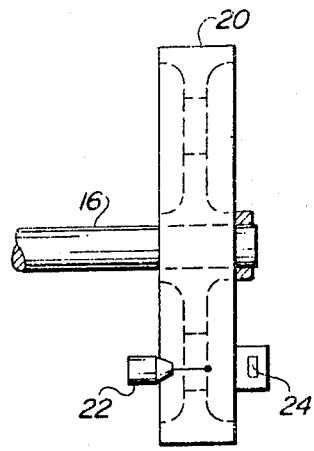
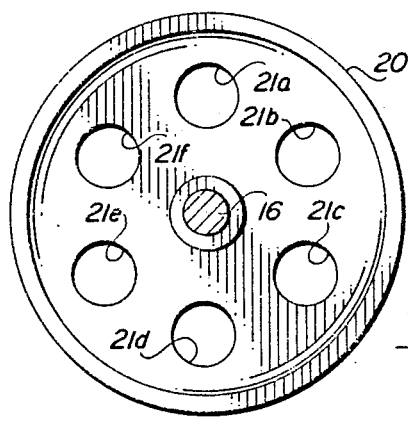
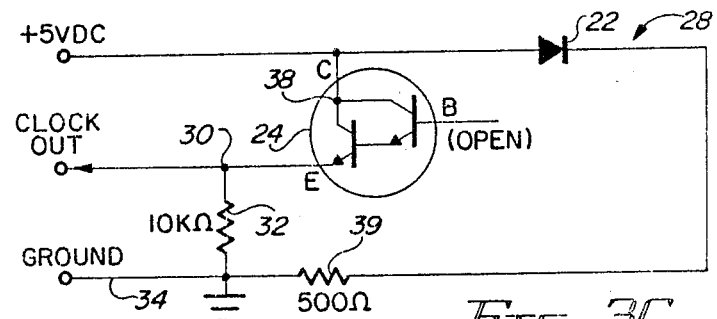
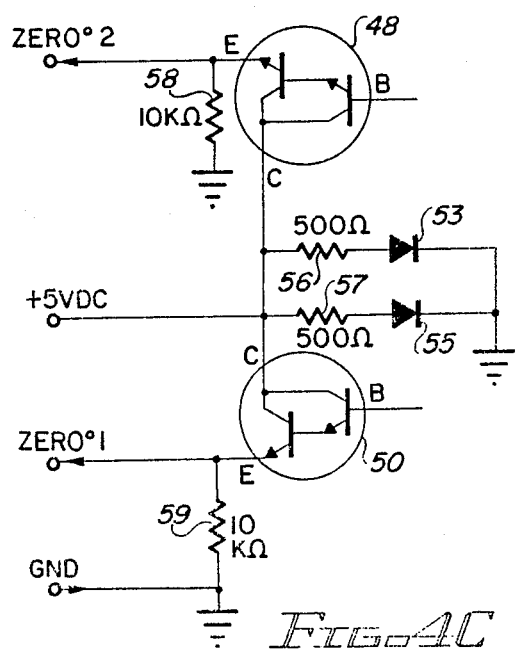
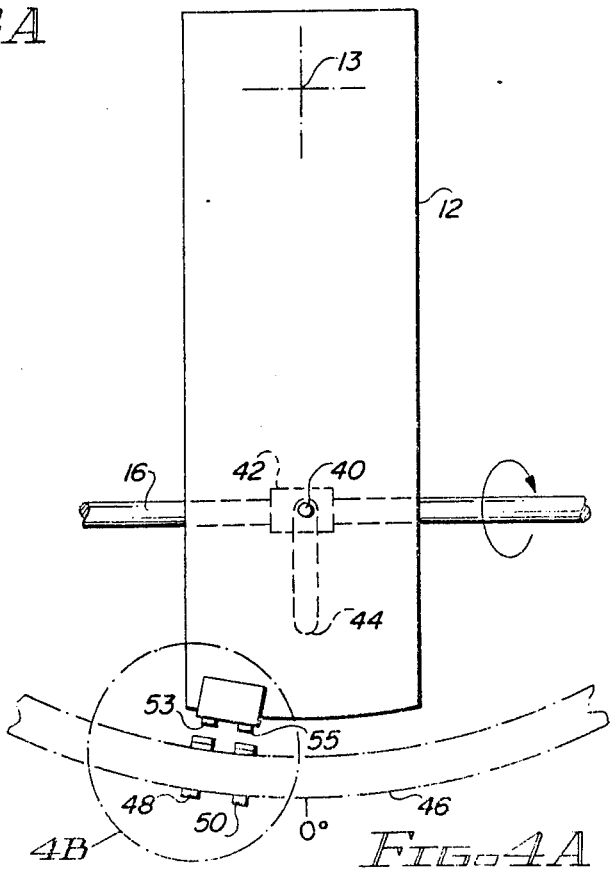

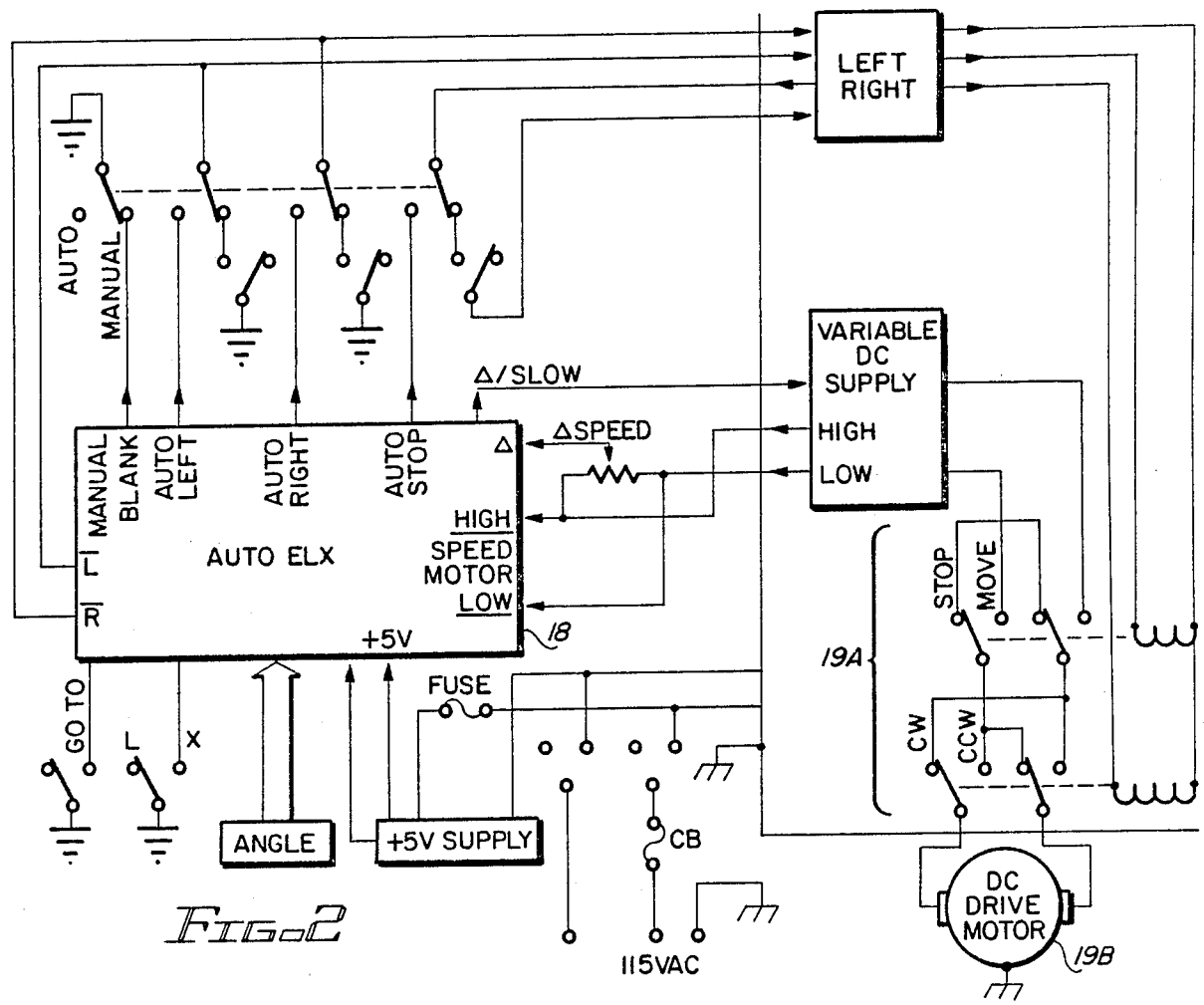
FIG-2
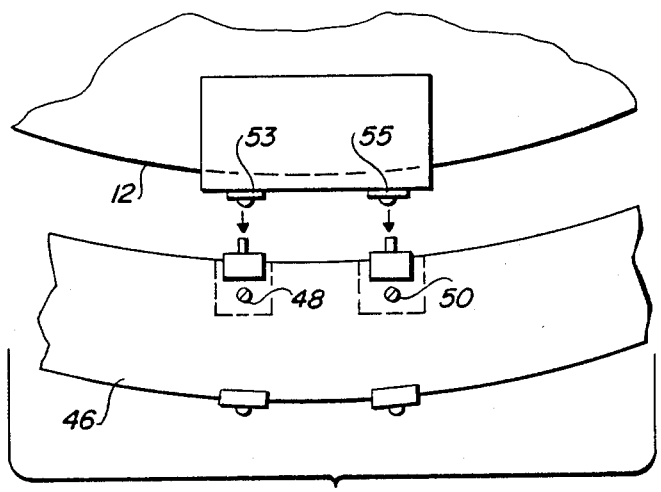
FIG-4B
| FIG. 5A | FIG. 5B |
| --- | --- |
| FIG. 5C | FIG. 5D |
| FIG. 5E | FIG. 5F |
| | FIG. 5H |
| FIG. 5G | |
FIG-6

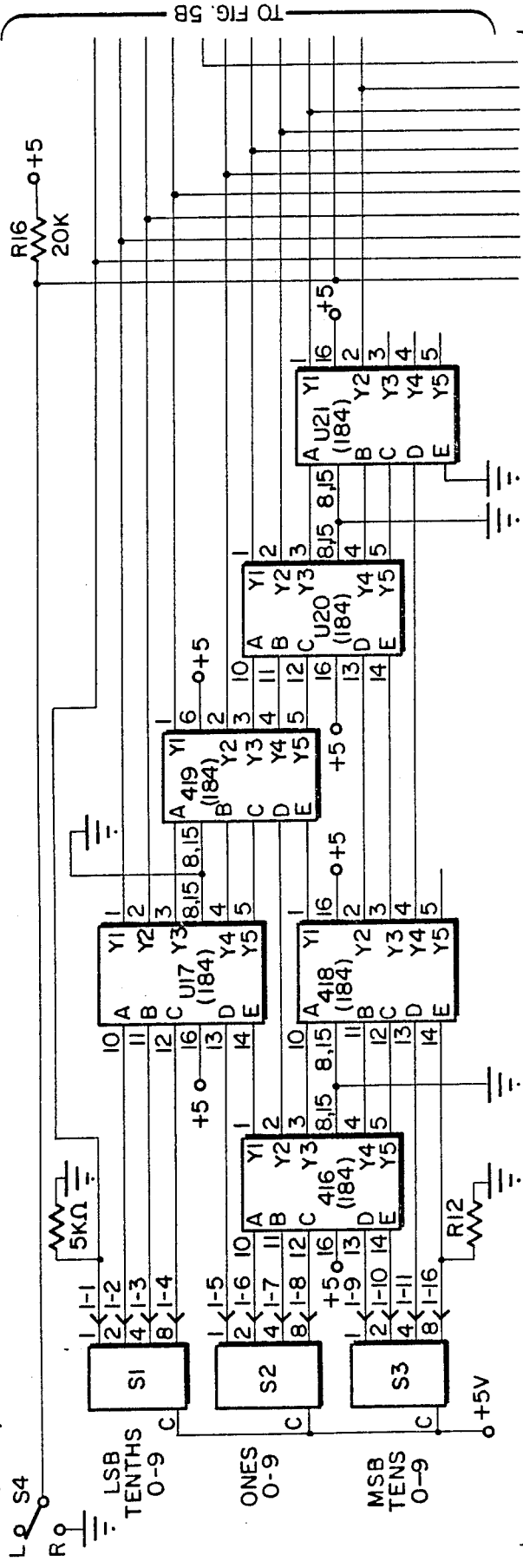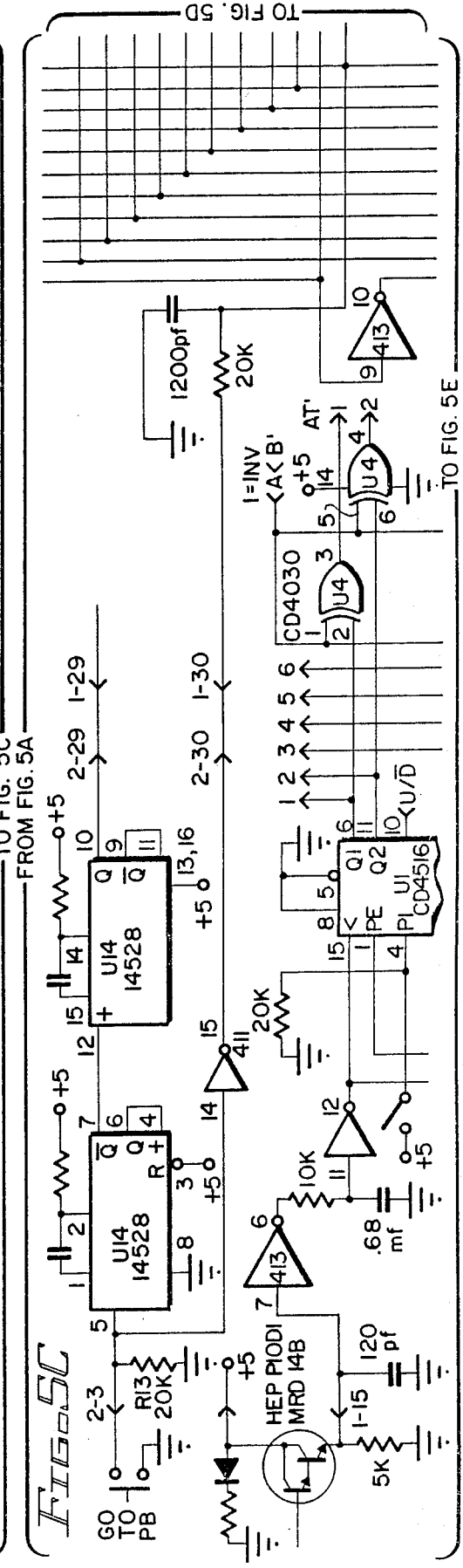

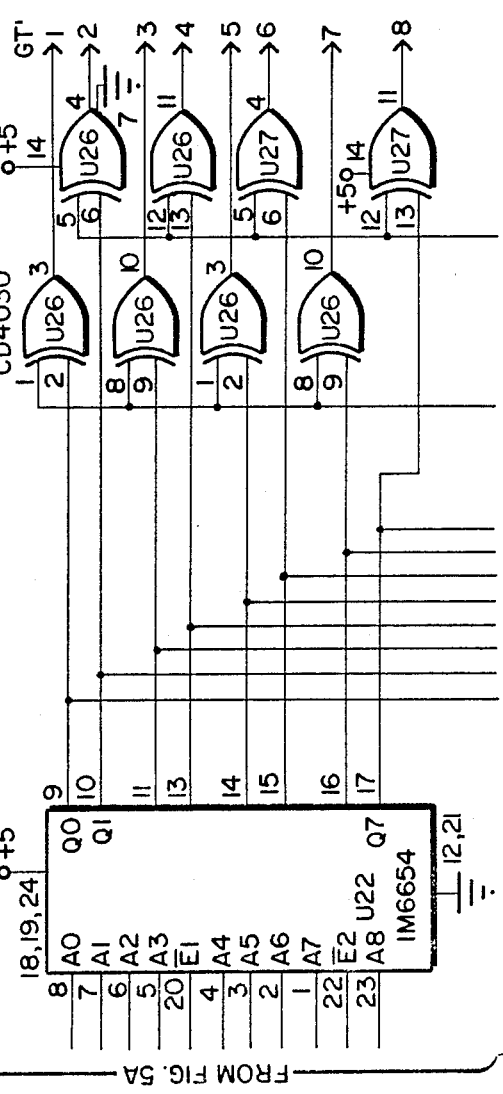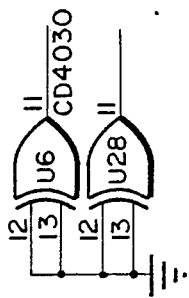

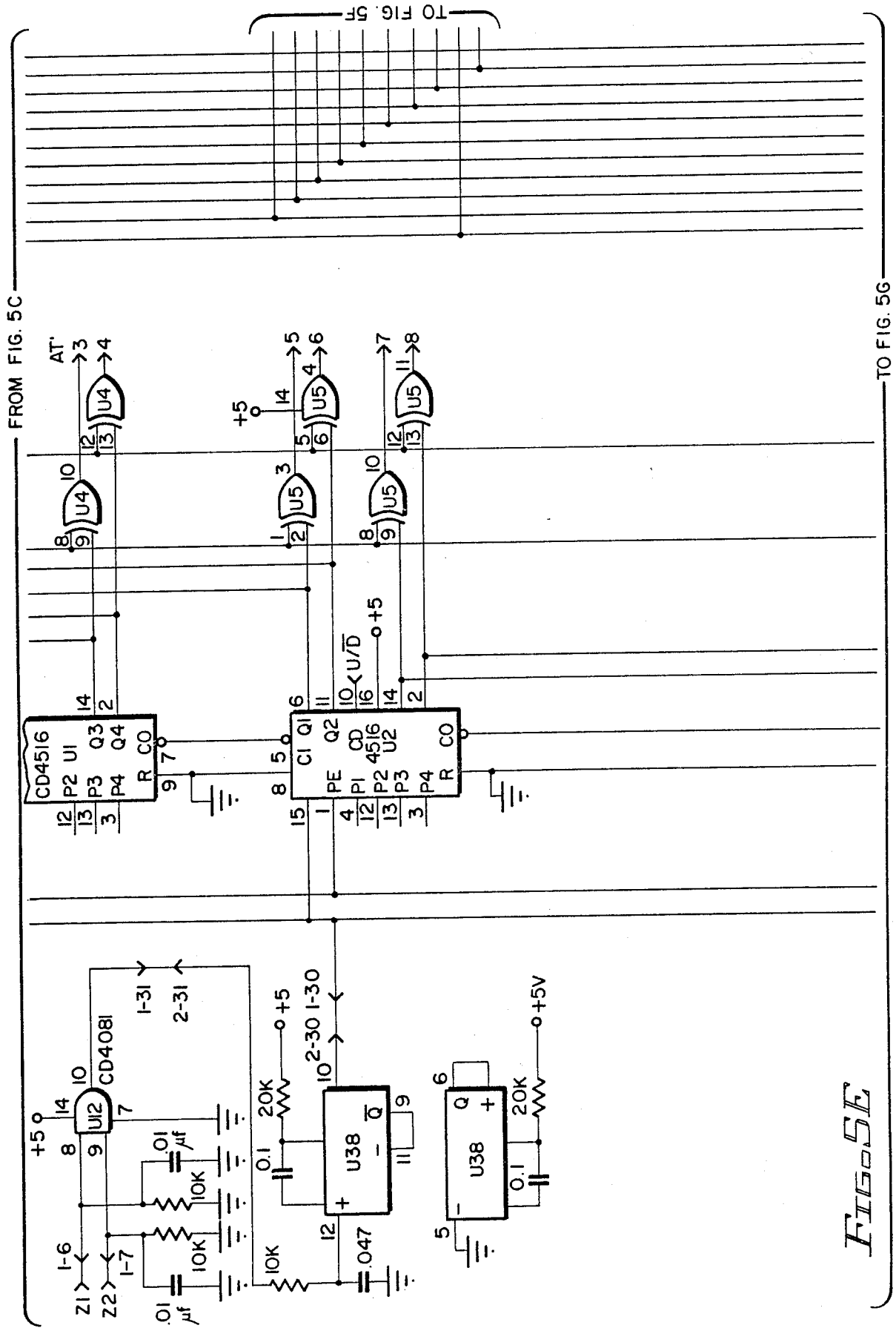

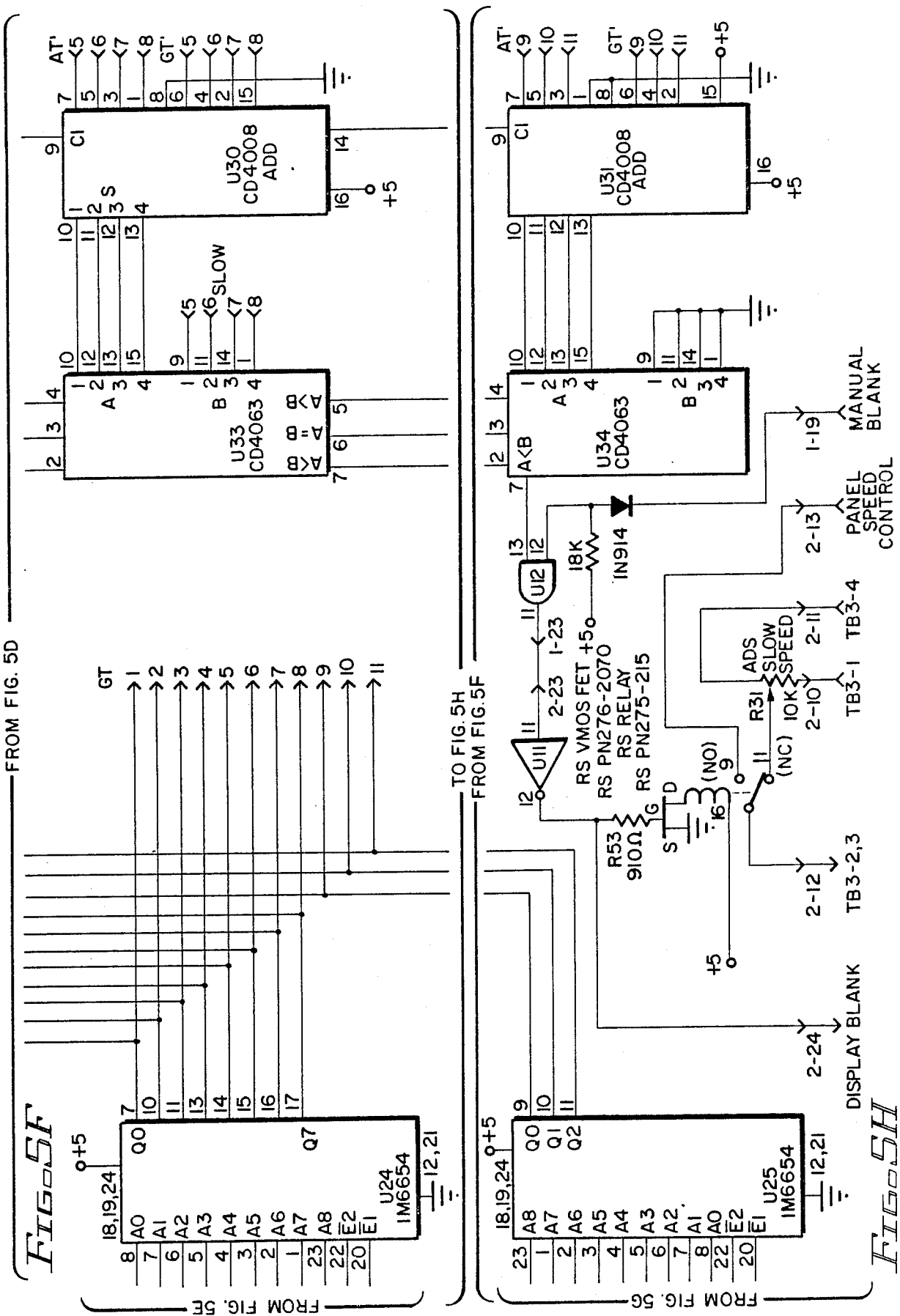

AUTOMATIC POSITIONER WITH NONLINEAR DRIVE

The U.S. Government has rights in this invention pursuant to Contract No. DAAK40-77-C-0122, awarded by the U.S. Army.

BACKGROUND OF THE INVENTION

1. Field of the Invention

This invention relates to automatic positioning of a mechanical arm, and in particular, to such automatic positioning with a nonlinear drive mechanism.

2. Description of the Related Art

In the burgeoning field of robotics, it has become commonplace to control the movement of a robot arm automatically, for example. Such an arm may be controlled in both angular and linear displacement with numerous available degrees of freedom. For example, an arm may be rotated about fixed axes fixed in three different coordinates with those axes which are orthogonal to the axis of the arm being located at different pivot points along the arm or at one end thereof. Linear positioning of the arm may also be effected, and control of a combination of these types of movement may be arranged. Numerous approaches to the controlling or positioning of a mechanical arm may be found in the prior art, as exemplified by the following U.S. patents and publication.

U.S. Pat. No. 3,261,967 to Rosin et al. discloses a mechanical device for measuring a dimension of any object which can be viewed with a TV camera. The TV camera is placed to view a point of reference on the object being measured and is then made to move and scan the object in the dimension to be measured. The amount of camera movement is proportional to the distance scanned on the object and thus a dimension may be measured by measuring the amount of movement. The mechanical device controlling the movement of the camera is nonlinear, and calculations are required to translate the mechanical movement into meaningful data.

The following U.S. patents disclose control systems for stepping motors: U.S. Pat. Nos. 3,324,369 to Markakis, 3,345,547 to Dunne, 3,353,076 to Haines, 3,426,258 to Van Pelt, and 3,573,593 to Beery. In all these patents the control system disclosed makes use of photocells and digital logic functions. Except for the hydraulic control mechanism disclosed in Van Pelt, all the control systems disclosed are electrical.

U.S. Pat. No. 3,660,746 to Milek discloses a system to prevent oscillation in a stepper motor as it advances from one position to another. Electronic damping is provided by digital circuits which advance a rotor from position to position while controlling the energization of all the stator windings.

U.S. Pat. No. 3,683,254 discloses a servo system arranged to reduce the effect of noise on system performance.

A drive circuit for providing high-level driving current to the stator coils of a stepping motor during stepping operation is disclosed in U.S. Pat. No. 3,893,012 to Lin.

In U.S. Pat. No. 3,748,566 a method of compensation for the angular error of an electric stepping motor is disclosed. An electrical error signal is generated whenever the rotor of the stepping motor deviates from a selected stepping position. This signal is used to correct or adjust the individual winding currents being supplied to the motor.

U.S. Pat. No. 3,719,878 to Ferguson et al. discloses an automatic control system using digital techniques to drive a stepper motor. A preselected output position triggers a synchronizing signal to insure periodic alignment between the input signal and the corresponding output control position. A monitoring capability is provided by a memory comparison system.

U.S. Pat. No. 3,942,619 to Nordstrom et al. discloses a printing apparatus including a multi-phase stepping motor with an opto-electronic control system. The stepper motor has photodetectors coupled to the shaft to detect mechanical position and movement. The system disclosed is for controlling linear mechanical movement with no attempt made to select specific mechanical positions.

U.S. Pat. No. 3,961,232 to Newell discloses a hybrid step motor system that utilizes coarse and fine stepper motors. The linear digital system disclosed requires binary coded decimal data as an input.

In U.S. Pat. No. 4,039,919 to Suzaki et al., a multi-phase motor controller is disclosed with a photodetector on the motor shaft to sense and control motor rpm.

An incrementally controllable motor drive system is disclosed in U.S. Pat. No. 4,042,863 to Von der Heide. Photodetectors and digital logic circuits are used to control the execution of steps having a preselected step length.

A control system for a stepper motor which utilizes velocity squared feedback is disclosed in U.S. Pat. No. 4,042,868 to Rhodes.

U.S. Pat. No. 4,107,595 to Campe discloses a circuit for controlling the power or current applied to a stepping motor in order to control the speed of the motor.

U.S. Pat. No. 4,158,800 to Jahelka et al. discloses digital circuitry for controlling the speed of a stepper motor. A closed loop feedback system is used which includes a coded disk driven by the motor and decoding means to derive signals from the disk.

U.S. Pat. No. 4,234,787 to Hutter et al. discloses an apparatus for monitoring the motion of any device which is caused by a turning wheel or which causes a wheel to turn. The motion is measured by counting pulses which are developed as the wheel is turned. A reference pulse is developed by some other actuating device at a specific place in the mechanism movement. The counter output is proportional to the movement of the mechanism from the reference point.

U.S. Pat. No. 4,110,828 to Baumgartner et al. discloses an error-preventing incremental measuring system utilizing a plurality of scanning elements associated to a relatively movable divided scale. The system combines the signals from the scanning elements by way of a logical network.

U.S. Pat. No. 4,289,983 to Bengnar et al. discloses an encoder for monitoring bidirectional motion. A disk with holes in it is attached to the armature of a stepper motor and the disk is allowed to rotate between a light emitter and a photodetector. A novel hole shape allows a single detector-emitter pair to be used for both clockwise and counterclockwise rotation.

U.S. Pat. No. 3,811,648 to Ream, Jr. et al. discloses a system for remotely positioning and displaying the position in azimuth of a movable instrumentation package. The package is mounted on a carriage driven by an electric motor around a circular track. A light beam directed toward two photocells is broken by a notched metal strip as the carriage moves along the track. The pulses generated by the photocells are counted, and the counter is reset every ten degrees by mechanical switches to cancel any small accumulated azimuth error.

In Vol. 19, No. 4, of IBM Technical Disclosure Bulletin of September, 1976, Fleek et al. disclose a sequence control for stepper motors. The circuit arrangement disclosed provides a control for operating a three-phase stepper motor in either full- or half-step mode. It also provides control for single-phase operation in a full-step mode.

None of the references described above disclose a solution to the problem of providing automatic positioning control with a nonlinear drive mechanism to provide linear angular movement. If a nonlinear drive mechanism is used, a given number of revolutions of the drive motor at one point will not produce the same angular displacement as the same amount of drive revolutions at another point.

SUMMARY OF THE INVENTION

In view of the limitations associated with the prior art, it is an object of the invention to furnish an automatic positioner that can be used with a nonlinear drive system.

It is another object of the invention to provide an automatic positioner that requires very little mechanical or electronic calibration.

Still another object of the invention is to provide an automatic positioner which is free of drift or significant error and is accurate to 0.1 degrees.

Finally, it is an object of the invention to provide an automatic positioner with circuitry that senses when the mechanism is within a presettable distance from where it should be and decreases the drive motor speed so that overshoot of the desired position is minimized.

In the accomplishment of these and other objects of the invention, a motor driven mechanical positioner is provided which will position a movable arm to any one of 840 discrete angular positions. A total angular range of +/−42 degrees can be covered in 0.1 degree increments. The mechanical arm is pinned at one end and allowed to move at the other. The movable end is attached to a drive via a slotted hole in the arm through which another pin is inserted which in turn is attached to a block assembly which moves left and right of the drive shaft when the drive shaft is turned. Such a mechanical drive arrangement is inherently non-linear in the relationship between differential angle of rotation about the pivot point and differential movement of the driving block assembly.

A drive shaft drive wheel has six evenly spaced holes through which light from an IR (infrared) LED (light emitting diode) is allowed to shine. The IR LED is placed on one side of the drive wheel and on the other side a light-sensitive transistor is placed. Radiation from the LED shines through the holes in the drive wheel one at a time as the wheel is rotated. As a result of the intermittent light striking the phototransistor, it turns on and off to give six clock pulses per revolution of the drive shaft.

Electronic circuitry controls the drive mechanism. To provide a reference point for the electronics, two phototransistors are mounted to a fixed dial position at the end of the movable arm to indicate degrees of movement. The phototransistors are movable with respect to one another, and there are two IR LEDs mounted to the arm in positions which allow radiation from them to strike the phototransistors as the arm is moved to the position where the phototransistors are mounted. The phototransistors are mounted in a position such that as the arm is moved through the position where they are located, one will be turning on just as the other is turning off. The two phototransistor outputs are added together, and their overlapping leading and trailing edges produce a very narrow pulse. The phototransistors are adjusted so that this pulse occurs at exactly zero degrees.

A desired position for the mechanical arm is entered into the electronics with thumb wheel BCD (binary coded decimal) switches at an angular position from 0.0 degrees to 42.0 degrees. The BCD information from the input thumb wheel switches is transformed into binary information to address EPROMs (erasable programmable read-only memories). For each possible binary address representative of a desired angular position, the selected EPROMs will output binary data that is representative of the clock pulse count for that particular angular position. Because of the nonlinearity of the drive mechanism, the clock pulse count is incremented at a nonlinear rate as the angular position is incremented. The data contained in the EPROMs is calculated from ordinary trigonometry. An angular position is specified by the 11-bit word.

There is additional circuitry in the automatic positioner that senses when the mechanism is within a preset distance from where it should be, and when this occurs, a presettable slow drive speed is called for to minimize overshoot.

BRIEF DESCRIPTION OF THE DRAWINGS

A better understanding of the present invention may be gained from a consideration of the following detailed description, taken in conjunction with the accompanying drawings in which:

FIG. 1 is a schematic plan view of the mechanical arrangement of the automatic positioner of the present invention;

FIG. 2 is a block diagram of the control electronics for the automatic positioner;

FIG. 3A is a plan view of the drive shaft drive wheel;

FIG. 3B is an end view of the drive shaft drive wheel showing the positioning of the IR LED and the phototransistor;

FIG. 3C is a circuit diagram of the phototransistor pulse producing circuit;

FIG. 4A is a partial plan view of the movable arm and fixed dial of the automatic positioner;

FIG. 4B is an expanded detail view of the area indicated in FIG. 4A;

FIG. 4C is a schematic diagram of the phototransistor circuitry used to produce the zero-degree reference pulse.

FIGS. 5A–5H are portions of an electrical schematic diagram of automatic control electronics for the positioner of the present invention; and FIG. 6 is a diagram showing the orientation of FIGS. 5A–5H.

DETAILED DESCRIPTION OF THE PREFERRED EMBODIMENT

Figure 5C:
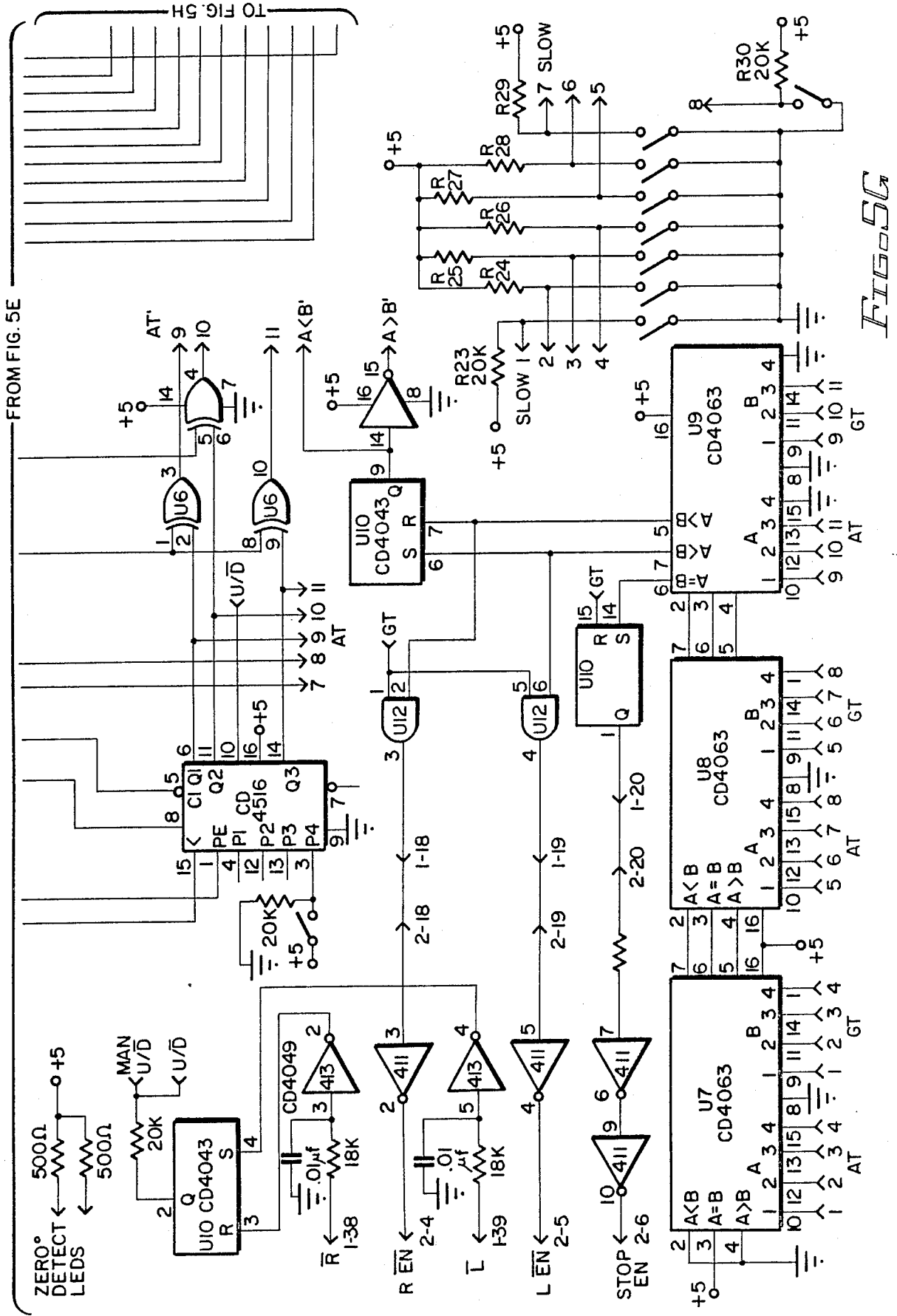

A schematic diagram of the mechanical arrangement of the automatic positioner 10 of the present invention is shown in FIG. 1. A mechanical arm 12 is pinned at one end at a pivot point 13 and allowed to move at the other end. The movable end is attached to a drive shaft 16 via a slotted hole in the arm through which another pin is inserted. This pin is in turn attached to a block assembly which moves left and right of the drive shaft 16 when the drive shaft 16 is turned.

The drive mechanism of the automatic positioner 10 is controlled by electronic circuitry 18 depicted schematically in FIG. 2. The operation of the control circuitry is described in detail below. The circuitry provides command signals to a relay 19A controlling the power of a motor 19B which drives the automatic positioner 10. The command signals are:
move clockwise
move counterclockwise
stop
move at slow speed
move at normal speed The electronics are designed to position the movable arm 12 to any one of 840 discrete angular positions within an angular range of +/−42 degrees in 0.1 degree increments. The block movement is one inch for every 9.9790017 turns of the drive shaft 16. The distance from the arm pivot point 13 to the drive shaft centerline is 14.575 inches.

A drive shaft drive wheel 20 is shown in FIGS. 3A and 3B. The wheel 20 has six evenly spaced holes 21a–21f through which light from an IR LED 22 is allowed to shine. The IR LED 22 is mounted on one side of the drive wheel 20. On the other side of the drive wheel 20 is positioned a light-sensitive transistor 24. Transistor 24 is positioned in such a way that the radiation from IR LED 22 is allowed to shine through the holes 21a through 21f in the drive wheel 20 one at a time as the drive wheel 20 is rotated by drive shaft 16. As light strikes the phototransistor 24 and then is blocked by the drive wheel 20 as it rotates, the phototransistor 24 turns on and off. As a result, six clock pulses are produced per revolution of drive shaft 16.

A pulse producing circuit 28 is shown schematically in FIG. 3C. An output pulse is produced at terminal 30 every time a light pulse from IR LED 22 impinges on phototransistor 24. Resistor 32 is connected from terminal 30 to ground terminal 34, and diode 22 is connected from collector 38 of phototransistor 24 in series with resistor 39 to ground terminal 34. A commercially available phototransistor such as MRD14B can be used in the pulse producing circuit 28.

Mechanical details of the connection of the movable end of mechanical arm 12 are shown in FIGS. 4A and 4B. Pin 40 extends from block 42 through slot 44 of mechanical arm 12. Block 42 has a threaded interior which rides on drive shaft 16. A fixed dial 46 is positioned at the movable end of mechanical arm 12 to indicate degrees of movement with respect to a center position. Phototransistors 48 and 50 are mounted to fixed dial 46 and are movable with respect to one another. Two IR LEDs 53 and 55 are mounted to mechanical arm 12 in positions which allow radiation from them to strike the phototransistors 48 and 50 as the mechanical arm 12 is moved to the position where phototransistors 48 and 50 are mounted. Phototransistors 48 and 50 are mounted in a position such that as the movable end of mechanical arm 12 is moved through the position where they are located, one phototransistor will be turning on just as the other is turning off. The outputs of phototransistors 48 and 50 are ANDed together, and their overlapping leading and trailing edges sum together to produce a very narrow pulse. The positions of phototransistors 48 and 50 are adjusted so that this pulse occurs at exactly zero degrees.

As shown in FIG. 4C, phototransistors 48 and 50 have their collectors connected together to a source of 5 volts DC. The same 5-volt source powers IR LEDs 53 and 55 through individual 500-ohm resistors 56 and 57. The anodes of IR LEDs 53 and 55 are grounded. The emitter of phototransistor 48 is grounded through a 10-kilohm resistor 58, and the emitter of phototransistor 50 is grounded through a 10-kilohm resistor 59. The base of phototransistor 48 is left unconnected, as is the base of phototransistor 50.

Operation of the Electronics

FIG. 2 is a schematic block diagram of the electronics. FIGS. 5A through 5H together make up an electrical schematic diagram of the control electronics. The following is a description of the operation of the control electronics.

To initialize the electronics at power turn on, the operator must cause the drive motor 19B to move the look angle arm 12 through zero degrees. This causes a zero-degree pulse at u12 pin 10 (FIG. 5E) to fire one-shot u38 to reset the AT counter (u1, u2, and u3). If left movement has been called for, u10 pin 2 (FIG. 5G) will have been set high, making the AT counter count up. If right movement was needed to make the arm move through zero degrees, the AT counter will be counting down.

After this initialization procedure has been accomplished in a manual mode, the look angle arm 12 may be positioned automatically by switching the motor movement commands from manually actuated switches to the electronic control.

The desired look angle is entered on BCD switches S1, S2, and 53 (FIG. 5A). S4 is placed to select a look angle left or right from zero. U16 through 21 decode the BCD outputs of S1-3 into binary information for the EPROM address. The EPROMs u22 and u23 (FIGS. 5B and 5D) contain the data locations from zero to 42.0° right. The EPROMs u24 and u25 (FIGS. 5F and 5H) contain the data locations from zero to 42.0° left. The EPROMs set to be used is selected by the left-right switch (FIG. 5A).

When the "Go to" pushbutton (FIG. 5C) is depressed the look angle address is strobed into the EPROMS by the positive going pulse at u11 pin 15.

The data from the EPROMs is compared at the output of the AT counter by the position magnitude comparator (u7, u8 and u9 in FIG. 5G). If the arm is left of where it should be the AT count will be a larger number than the "Go to" (EPROM data) number. The A<B output at u9 pin 5 will be high.

If the arm is right of where it should be, the A<B output at u9 pin 7 will be high.

When the "Go to" button is depressed u10 pin 1 is reset removing the STOP ENABLE. The "Go to" one shot u14 pin 10 output pulse is ANDed with the u9 output by u12 pins 1, 2, 3 and 4, 5, 6 to call for either left or right movement.

The u9 outputs also control the output of u10 pin 9 and u13 pin 15, A<B' and A>B'. These signals are in turn applied to the exclusive or's, u4, 5, 6, 26, 27, and 28. The result of this application is to invert the smaller of the two numbers. The inverted and noninverted numbers of AT' and GT' (FIGS. 5B–5G) are then summed together and added to 1 by u29, 30, and 31 (FIGS. 5D, 5F and 5H). The result of the inversion and addition results in the difference between where the look angle arm is and where it should be.

The difference is then compared to a number present on "slow" dip switch 1-8 (FIG. 5H) by u32-34 (FIGS. 5D, 5F and 5H). When the difference falls below the "slow" number, u34 pin 7 (A<B) goes high. When the automatic mode has been selected, the signal from u34 pin 7 is allowed to turn off power FET Q1, changing the relay state of K1 and allowing the motor speed to be controlled from a presettable slow speed control. This is to insure that the mechanism approaches the point where it should be at a slow speed to insure minimum overshoot.

When the AT counter has incremented to a count equal to the "Go to" number, u9 pin 6 A>B (FIG. 5G) goes high, setting u10 pin 1 and calling for the motor to stop.

HEX display u36 (FIGS. 5B and 5D) displays the error in clock pulses between where the look angle arm is located and where it wanted to go.

The BCD information from the input thumb wheel switches s1, 2 and 3 is transformed into binary information to address the EPROMs by u16-u21 (FIG. 5A). For each possible binary address that is representative of a desired angular position, the selected EPROMs will output binary data that is representative of the clock pulse count for that particular angular position.

Due to the nonlinearity of the drive mechanism, the clock pulse count is incremented at a nonlinear rate as the angular position is incremented.

The data for angular position consists of an 11-bit word. For angles from 0 degrees to 42 degrees left, the data comes from u22 (FIG. 5B) and u23 (FIG. 5D). U22 controls the 8 least significant bits (LSB) of the word and u23 controls the 3 most significant bits (MSB) of the word.

For angles from 0 degrees to 42 degrees right, the data comes from u24 and u25. U24 controls the 8 lower bits (LSB) of the word and u25 controls the 3 upper (MSB) bits of the word.

In order to generate the data contained in the EPROMs the data must be calculated. The best way is to use a computer to do the calculation necessary.

The actual formula is fairly simple, consisting of a common trigonometric formula (see FIG. 1):

$$\tan \theta = y/x$$

Since it is the value of y that is of interest, the formula can be transposed to give $$y = X(\tan \theta)$$

The distance from the pivot point of the look angle arm to the drive shaft is 14.575 inches. Therefore:

$$y = 14.575(\tan \theta)$$

will give y in inches.
The mechanism produces 59.875326 clock pulses per inch. Therefore:

$$y = 14.575(\tan \theta)59.875326$$

will give y in clock pulses.
The determination of total clock count from 42 degrees right to 42 degrees left is 1571.5458 is realized by measuring with test equipment. The count at 0 degrees should be ½ the total count or 785.7729.

The previous formula gave the length of y in clock pulses from 0 degrees at point A to $\theta$ at point B. By subtracting y from 785.7729 the count in clock pulses at B for angles right of 0 degrees is obtained. By adding y to 785.7729 the count in clock pulses at B for angles left of 0 degrees is obtained.

A typical computer program written in BASIC computer language for the SINCLAIR ZX81 (TIMEX 1000) personal computer is listed in Appendix I. This program may be used to generate the data for the EPROMs. Referring to steps 70 and 75, one finds the trig formula $y = x(\tan \theta)$ modified to produce the clock pulse count for any angular position (N). Since the ZX81 computes in radians, N is also divided by 180 times 3.14 to give degrees.

Step 70 is for angles right of 0 degrees:

70 IF D$="R" THEN LET A=785.7729−(TAN (N/180*PI)*14.575*59.875326)

Step 75 is for angles left of 0 degrees:

75 IF D$="L" THEN LET A=785.7729+(TAN (N/180*PI)*14.575*59.875326)

Appendix II lists a sample of the generated EPROM data for angles between 0 and 6.3 degrees left in incremental steps of 0.1 degree. The data is divided into four columns:

Column 1 lists the angle increment.
Column 2 shows the clock count representative of angular position (785.7–882.1 base 10).
Column 3 contains the EPROM address in hexadecimal (0000–003F). This is column 1 translated from base 10 into base 16.
Column 4 lists the EPROM Data in hexadecimal (0312–0372). This is column 2 translated from base 10 into base 16.

Looking at column 4 (EPROM Address), one finds the address in hexadecimal form which is compatible with most EPROM programming machines. Looking at column 4 (EPROM Data), again one finds hexadecimal form for the same reason.

The first two numbers of the overall data belong to the 0 to 42 degrees left MSB EPROM u23. The last two numbers of the Data belong to the 0 to 42 degrees left LSB EPROM u22. For example, the first and last addresses loading u23 (MSB) from the data are:

|  |  | u23 input Address | u23 output Data |
| --- | --- | --- | --- |
| 0° | First | 0000 | 03 |
| 42°. | Last | 01A4 | 06 |

(After addresses 01A2 continue to fill to 01FF with 06)

The first and last address loading U22 (LSB) from the data are:

|  |  | u22 input Address | u22 output Data |
| --- | --- | --- | --- |
| 0° | First | 0000 | 12 |
| 42° | Last | 01A4 | 24 |

(After address 01A2 continue to fill to 01FF with 24)

Loading the data into the EPROMs for 0–42 degrees Right (u24 LSB and u25 MSB) is accomplished in the same manner.

The automatic positioner with a nonlinear drive system which has been described above requires very little mechanical or electronic calibration. It has been found free of drift or significant error and accurate to within 0.1 degree. It has the added advantage of minimizing overshoot by decreasing the drive motor speed when the mechanism is within a presettable distance from where it should be.

Although there have been described above specific arrangements of an automatic positioner with nonlinear drive in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

APPENDIX I

```
5  REM "OP EPROM"

6  POKE 16417,1

7  DIM N(2)

8  LET N(2)=20

9  SLOW

10 PRINT "OPTICS BENCH LOOK "; "ANGLE "

11 PRINT

12 PRINT "ELXEPROM PROGRAM"

13 PRINT "L, FORRESTER"

14 LET N=-.1

15 DIM O(4)

16 DIM O$(4)

17 DIM H(4)

18 DIM H$(4)

19 PRINT

20 PRINT "DO YOU WANT RIGHT"; " OR LEFT?"

21 PRINT

22 PRINT "ENTER R FOR RIGHT"

23 PRINT "L FOR LEFT"

25 INPUT D$

26 LET N(1)=0

27 CLS
```

```
28 FAST

29 LET L=4

30 GOSUB 32

31 GOTO 60

32 IF D$="R" THEN GOTO 39

33 IF D$="L" THEN GOTO 43

34 GOTO 09

39 PRINT "0-42 DEG RIGHT"

40 PRINT

42 GOTO 45

43 PRINT "0-42 DEG LEFT"

44 PRINT

47 IF D$="R" THEN PRINT AT 3,0;"ANG R"

48 IF D$="L" THEN PRINT AT 3,0;"ANG L"

49 PRINT AT 4,0;"____";"____  ____  ____  ____"

50 PRINT AT 2, 27; "DATA"

51 PRINT AT 3, 8; "COUNT"

52 PRINT AT 3, 17; "ANG"

54 PRINT AT 3, 22; "ADDR"

55 PRINT AT 3, 27; "MS LS "

57 RETURN

60 FOR N=0 TO 42.0 STEP 0.1

70 IF D$="R" THEN LET
   A=785,7729-(TAN (N/180*PI)*14.575*59.875326)

75 IF D$="L" THEN LET
   A=785,7729+TAN (N/180*PI)*14.575*59.875326)

80 LET L=L+1

82 LET N(1)=N(1)+1

85 IF L=22 THEN GOTO 400
```

```
90  PRINT AT L,0;N

95  LET A=(INT (A*10))/10

100 PRINT AT L,8;A

102 PRINT AT L,17;N

110 LET X=INT ((N*10)+.5)

120 GOSUB 1000

130 LET Y=22

135 LET F=0

140 GOSUB 500

150 LET X=INT (A+.5)

160 GOSUB 1000

170 LET Y=27

175 LET F=1

180 GOSUB 500

182 IF L=N(2) THEN COPY

183 IF L=N(2) THEN PAUSE 100

184 IF L=N(2) THEN CLS

185 IF L=N(2) THEN GOSUB 47

186 IF L=N(2) THEN LET L=4

190 NEXT N

195 COPY

200 PRINT

210 PRINT "DO YOU WANT THE "

220 PRINT "OTHER DIRECTION?"

225 PRINT

230 PRINT "ENTER Y FOR YES"

235 PRINT "ENTER N FOR NO"

240 INPUT G$
```

```
245 CLS

250 IF G$="Y" THEN GOTO 300

255 IF G$="N" THEN GOTO 270

260 CLS

265 GOTO 210

270 STOP

300 IF D$="R" THEN GOTO 310

305 IF D="L" THEN GOTO 320

310 LET D$="L"

315 GOTO 29

320 LET D$="R"

325 GOTO 29

500 REM "HEX PRINT"

501 LET O(1)=H(1)

502 LET O(2)=H(2)

503 LET O(3)=H(3)

504 LET O(4)=H(4)

511 LET O$(1)=H$(1)

512 LET O$(2)=H$(2)

513 LET O$(3)=H$(3)

514 LET O$(4)=H$(4)

610 IF O(4)<10 THEN PRINT AT L,Y;O(4)

615 IF O(4)>9 THEN PRINT AT L,Y;O$(4)

620 IF O(3)<10 THEN PRINT AT L Y+1;O(3)

625 IF O(3)>9 THEN PRINT AT L,Y+1;O$(3)

630 IF O(2)<10 THEN PRINT AT L,Y+F+2;O(2)

635 IF O(2)>9 THEN PRINT AT L,Y+F+2;O$(2)

640 IF O(1)<10 THEN PRINT AT L,Y+F+3;O(1)

645 IF O(1)>9 THEN PRINT AT L,Y+F+3;O$(1)
```

```
650 RETURN

1000 REM "BASE 10 TO 16"

1001 LET H(1)=0

1002 LET H(2)=0

1003 LET H(3)=0

1004 LET H(4)=0

1005 LET H$(1)=""

1006 LET H$(2)=""

1007 LET H$(3)=""

1008 LET H$(4)=""

1010 LET H(4)=INT (X/4096)

1010 IF H(4)=0 THEN GOTO 1060

1020 LET M=H(4)

1030 GOSUB 2000

1040 LET H$(4)=M$

1050 LET X=X-(H(4)*4096)

1060 LET H(3)=INT (X/256)

1070 IF H(3)=0 THEN GOTO 1120

1080 LET M=H(3)

1090 GOSUB 2000

1100 LET H$(3)=M$

1110 LET X=X-(H(3)*256)

1120 LET H(2)=INT (X/16)

1130 IF H(2)=0 THEN GOTO 1180

1140 LET M=H(2)

1150 GOSUB 2000

1160 LET H$(2)=M$

1170 LET X=X-(H(2)*16)

1180 LET H(1)=INT (X+.5)
```

```
1190 IF H(1)=0 THEN RETURN

1200 LET M=H(1)

1210 GOSUB 2000

1220 LET H$(1)=M$

1230 RETURN

2000 REM "0-16 TO 0-9,A-F"

2010 LET M$=""

2020 IF M<10 THEN RETURN

2030 IF M=10 THEN LET M$="A"

2040 IF M=11 THEN LET M$="B"

2050 IF M=12 THEN LET M$="C"

2060 IF M=13 THEN LET M$="D"

2070 IF M=14 THEN LET M$="E"

2080 IF M=15 THEN LET M$="F"

2090 RETURN
```

APPENDIX II 0-42 DEG LEFT (Sample 0 to 6.3 Degrees):

| ANG L | COUNT | ADDR | DATA MS | LS |
|---|---|---|---|---|
| 0 | 785.7 | 0000 | 03 | 12 |
| 0.1 | 787.2 | 0001 | 03 | 13 |
| 0.2 | 788.8 | 0002 | 03 | 15 |
| 0.3 | 790.3 | 0003 | 03 | 16 |
| 0.4 | 791.8 | 0004 | 03 | 18 |
| 0.5 | 793.3 | 0005 | 03 | 19 |
| 0.6 | 794.4 | 0006 | 03 | 1B |
| 0.7 | 796.4 | 0007 | 03 | 1C |
| 0.8 | 797.9 | 0008 | 03 | 1E |

| ANG L | COUNT | ADDR | DATA MS | LS |
|---|---|---|---|---|
| 0.9 | 799.4 | 0009 | 03 | 1F |
| 1 | 801 | 000A | 03 | 21 |
| 1.1 | 802.5 | 000B | 03 | 23 |
| 1.2 | 804 | 000C | 03 | 24 |
| 1.3 | 805.5 | 000D | 03 | 26 |
| 1.4 | 807.1 | 000E | 03 | 27 |
| 1.5 | 808.6 | 000F | 03 | 29 |
| 1.6 | 810.1 | 0010 | 03 | 2A |
| 1.7 | 811.6 | 0011 | 03 | 2C |
| 1.8 | 813.1 | 0012 | 03 | 2D |
| 1.9 | 814.7 | 0013 | 03 | 2F |
| 2 | 816.2 | 0014 | 03 | 30 |
| 2.1 | 817.7 | 0015 | 03 | 32 |
| 2.2 | 819.2 | 0016 | 03 | 33 |
| 2.3 | 820.8 | 0017 | 03 | 35 |
| 2.4 | 822.3 | 0018 | 03 | 36 |
| 2.5 | 823.8 | 0019 | 03 | 38 |
| 2.6 | 825.4 | 001A | 03 | 39 |
| 2.7 | 826.9 | 001B | 03 | 3B |
| 2.8 | 828.4 | 001C | 03 | 3C |
| 2.9 | 829.9 | 001D | 03 | 3E |
| 3 | 831.5 | 001E | 03 | 40 |
| 3.1 | 833 | 001F | 03 | 41 |
| 3.2 | 834.5 | 0020 | 03 | 43 |
| 3.3 | 836 | 0021 | 03 | 44 |
| 3.4 | 837.6 | 0022 | 03 | 46 |
| 3.5 | 839.1 | 0023 | 03 | 47 |

| ANG L | COUNT | ADDR | DATA MS LS |
|---|---|---|---|
| 3.6 | 840.6 | 0024 | 03 49 |
| 3.7 | 842.2 | 0025 | 03 4A |
| 3.8 | 843.7 | 0026 | 03 4C |
| 3.9 | 845.2 | 0027 | 03 4D |
| 4 | 846.7 | 0028 | 03 4F |
| 4.1 | 848.3 | 0029 | 03 50 |
| 4.2 | 849.8 | 002A | 03 52 |
| 4.3 | 851.3 | 002B | 03 53 |
| 4.4 | 852.9 | 002C | 03 55 |
| 4.5 | 854.4 | 002D | 03 56 |
| 4.6 | 855.9 | 002E | 03 58 |
| 4.7 | 857.5 | 002F | 03 5A |
| 4.8 | 859 | 0030 | 03 5B |
| 4.9 | 860.5 | 0031 | 03 5D |
| 5 | 862.1 | 0032 | 03 5E |
| 5.1 | 863.6 | 0033 | 03 60 |
| 5.2 | 865.1 | 0034 | 03 61 |
| 5.3 | 866.7 | 0035 | 03 63 |
| 5.4 | 868.2 | 0036 | 03 64 |
| 5.5 | 869.8 | 0037 | 03 66 |
| 5.6 | 871.3 | 0038 | 03 67 |
| 5.7 | 872.8 | 0039 | 03 69 |
| 5.8 | 874.4 | 003A | 03 6A |
| 5.9 | 875.9 | 003B | 03 6C |
| 6 | 877.4 | 003C | 03 6D |
| 6.1 | 879 | 003D | 03 6F |
| 6.2 | 880.5 | 003E | 03 71 |

| ANG L | COUNT | ADDR | DATA MS LS |
|---|---|---|---|
| 6.3 | 882.1 | 003F | 03 72 |
| . | . | . | . |
| . | . | . | . |
| . | . | . | . |
| 41.9 | 2.7 | 01A3 | 00 03 |
| 42 | 0 | 01A4 | 00 00 |

What is claimed is:

1. An automatic angular positioner comprising:
   a frame;
   an arm having one end pivotably attached to said frame;
   reference sensing means coupled between the frame and a movable portion of the arm to signal the presence of the arm in a 0° reference position;
   reversible drive means slidably coupled to said arm at a position displaced from said one end; and
   electronic control means for controlling said drive means in response to manually and automatically produced signals compared with signals from the reference sensing means to develop a selected angular position of said arm relative to said reference position.

2. The angular positioner of claim 1 in which said electronic control means comprise:
   input means for setting a desired angular position;
   clock pulse generating means for generating a total number of pulses corresponding to how far said arm has moved from reference position on its way toward said desired position;
   counting means for counting pulses generated by said pulse generating means;
   registering means for keeping a current clock pulse count;
   translation means for translating said setting of said input means into a corresponding clock pulse count;
   comparing means for comparing said corresponding clock pulse count with said current clock pulse count; and
   means for shutting off said drive means when said current clock pulse count is determined by said comparing means to be equal to said corresponding clock pulse count.

3. The angular positioner of claim 2 further comprising a sensing mechanism that produces an output signal when said arm is within a predetermined distance of a position set on said input means; and speed control means responsive to said sensing mechanism output signal to reduce the speed of said drive means.

4. The angular positioner of claim 2 wherein said input means comprise binary coded decimal thumb wheel switches and said translation means comprise means for transforming the binary coded decimal information from said thumb wheel switches into binary addresses, and further including a plurality of EPROMs storing clock pulse count data in locations addressed by said binary addresses provided by said transforming means.

5. The positioner of claim 1 wherein said reversible drive means comprise:
   a motor having a rotatable drive shaft with a threaded portion, a block which moves on said threaded portion of said drive shaft, and a pin attached to said block, slidably engaged in a slot in said arm.

6. The positioner of claim 5 further comprising:
   a drive wheel mounted concentrically on said motor shaft, having a plurality of equally spaced holes therethrough along a circumference;
   a light source mounted in a fixed position to one side of said circumference of said drive wheel;
   a light detector mounted on the other side of said drive wheel opposite said light source; and
   a pulse-producing circuit electrically connected to said light source and to said light detector.

7. The positioner of claim 6 further comprising:
   a fixed dial attached to said frame, said dial having first and second adjacent light detectors mounted thereon;
   first and second light sources mounted on said arm and spaced apart by the same amount as said first and second detectors, said light sources facing said light detectors; and
   a zero-position pulse-generating circuit electrically connected to said first and second light sources and also to said first and second light detectors to provide a signal output.

8. The positioner of claim 6 wherein said electronic control means comprise:
   motor control means;
   first manually settable binary coded decimal switch;
   second manually settable binary coded decimal switch;
   third manually settable binary coded decimal switch;
   decoder means for decoding the binary coded decimal outputs of said first, second, and third binary coded decimal switches;
   a plurality of EPROMs for storing clock pulse count data in locations addressed by the binary information from said decoder means;
   a "Go to" pushbutton for strobing an address into said EPROMs;
   an AT counter connected to an output of said pulse-producing circuit and resettable to zero by said output of said zero-position pulse generating circuit;
a position magnitude comparator connected to an output of said AT counter and to the outputs of said EPROMs;
a "Go to" one-shot connected to said AT counter;

a plurality of exclusive or gates;
a "slow" dip switch on which a presettable number is present;
a motor relay connected to said motor; and
a HEX display.

* * * * *